United States Patent

Braatz

[11] 4,228,449
[45] Oct. 14, 1980

[54] SEMICONDUCTOR DIODE ARRAY LIQUID CRYSTAL DEVICE

[75] Inventor: Paul O. Braatz, Canoga Park, Calif.

[73] Assignee: Hughes Aircraft Company, Culver City, Calif.

[21] Appl. No.: 973,513

[22] Filed: Dec. 26, 1978

[51] Int. Cl.² .......................................... H01L 27/14
[52] U.S. Cl. ..................................... 357/30; 357/19; 350/331 R; 350/336; 250/370
[58] Field of Search ...................... 357/30, 19, 4, 31; 350/330, 331, 338, 336; 250/370

[56] References Cited

U.S. PATENT DOCUMENTS

| | | | |
|---|---|---|---|
| 4,032,954 | 6/1977 | Grinberg | 357/30 |
| 4,114,991 | 9/1978 | Bleha, Jr. | 350/338 |

Primary Examiner—Martin H. Edlow
Attorney, Agent, or Firm—John Holtrichter, Jr.; William H. MacAllister

[57] ABSTRACT

There is herein described a device useful to store a frame of low-intensity optical information over a wide spectral range or useful as a real-time light valve in visible to infrared conveter application. The device basically includes either a storage mode liquid crystal or a dynamic scattering or a field-effect liquid crystal, and a semiconductor diode array substrate wherein an insulating film with an array of conducting windows separates the liquid crystal from an active region in the substrate. A separate diffused junction is disposed in the active region adjacent each of the windows, the latter being adapted to both reflect incident light energy and conduct electrical current.

11 Claims, 3 Drawing Figures

SEMICONDUCTOR DIODE ARRAY LIQUID CRYSTAL DEVICE

BACKGROUND OF THE INVENTION

The background of the invention will be set forth in two parts.

FIELD OF THE INVENTION

This invention relates to electro-optical devices and more particularly to semiconductor diode/liquid crystal structures useful in frame storage mode and visible to infrared converter applications.

DESCRIPTION OF THE PRIOR ART

Presently existing storage-mode light valves employ an evaporated thin-film CdS layer on a glass substrate which is used in either of two device configurations to form a high impedance diode junction. In the dc species of storage light valves, this junction is formed at the CdS/liquid crystal interface, and although this device has been shown to be quite sensitive, its performance and applicability to a frame storage is limited. For example, input optical response is restricted to the spectral range 500 nm to 600 nm. The transient response is limited by the CdS photoconductor which, because of notorious trapping effects, in the bulk and at the junction, restricts the rate at which images can be stored. The operational lifetime of this type of device is severely limited by electro-chemical reactions between the CdS and liquid crystal. Also, low processing yields during fabrication of the CdS film is an important factor, as well as the fact that alignment of liquid crystal at the photoconductor/liquid crystal interface is difficult to control.

Some of the above problem areas have been circumvented in the ac storage light valve which employs a CdS/CdTe hetrojunction and a dielectric mirror to reduce the chemical degradation of the substrate. Unfortunately, this type of device requires the use of large ac electric fields across the substrate which appears to induce localized defects that ultimately limit the cosmetic quality, operational performance and lifetime of the device. By the nature of the ac photoconductive effects incorporated into the design, the performance of present-day ac storage light valves is limited. For example, this type of device exhibits low sensitivity resulting from capactive leakage in both the ON and OFF states, has a slow response, a narrow spectral range and low yields. It can therefore be seen that a technique which overcomes these disadvantages would constitute a significant advancement of the art.

SUMMARY OF THE INVENTION

In view of the foregoing factors and conditions characteristic of the prior art, it is a primary object of the present invention to provide an improved electro-optical device.

Another object of the present invention is to provide a semiconductor diode array liquid crystal device that has high sensitivity over a broad spectral range which may extend to both x-rays and alpha particles.

Still another object of the present invention is to provide a semiconductor diode array liquid crystal storage mode device which exhibits transient characteristics limited only by the particular storage liquid crystal chosen for the device.

Yet another object of the present invention is to provide a semiconductor diode array liquid crystal device that is chemically inert, this has high manufacturing yields and inherently high operational reliability.

In accordance with the present invention, a semiconductor diode array liquid crystal device is provided for storage mode and infrared applications and includes a liquid crystal structure having an inner surface, a semiconductor substrate having an inner surface, and an insulating film disposed between and separating these inner surfaces and also including an array of windows that are both reflective of incident light energy thereon and conductive of electric current. The semiconductor substrate includes an active region therein along the inner surface of the semiconductor substrate, and separate minority carrier collecting junctions are disposed in the active region adjacent each of the windows, the active region not being wider than the diffusion length of the minority carriers in the material of the active region. Further, the invention includes a biasing means associated with the liquid crystal structure and the semiconductor substrate for producing an electric field within the liquid crystal structure and for back biasing the minority carrier collecting junctions.

The invention may utilize a storage mode liquid crystal in a real-time light valve application, or the invention may instead incorporate a dynamic scattering or a field-effect liquid crystal structure in visible to infrared converter applications. Also, the semiconductor diode array structure may be a P-N or an N-P device, and the minority carrier collecting junctions (back-biased diodes) may be P-N or Schottky barrier junctions.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like elements in the several views.

DESCRIPTION OF THE PREFERRED EMBODIMENTS

Figure 1:
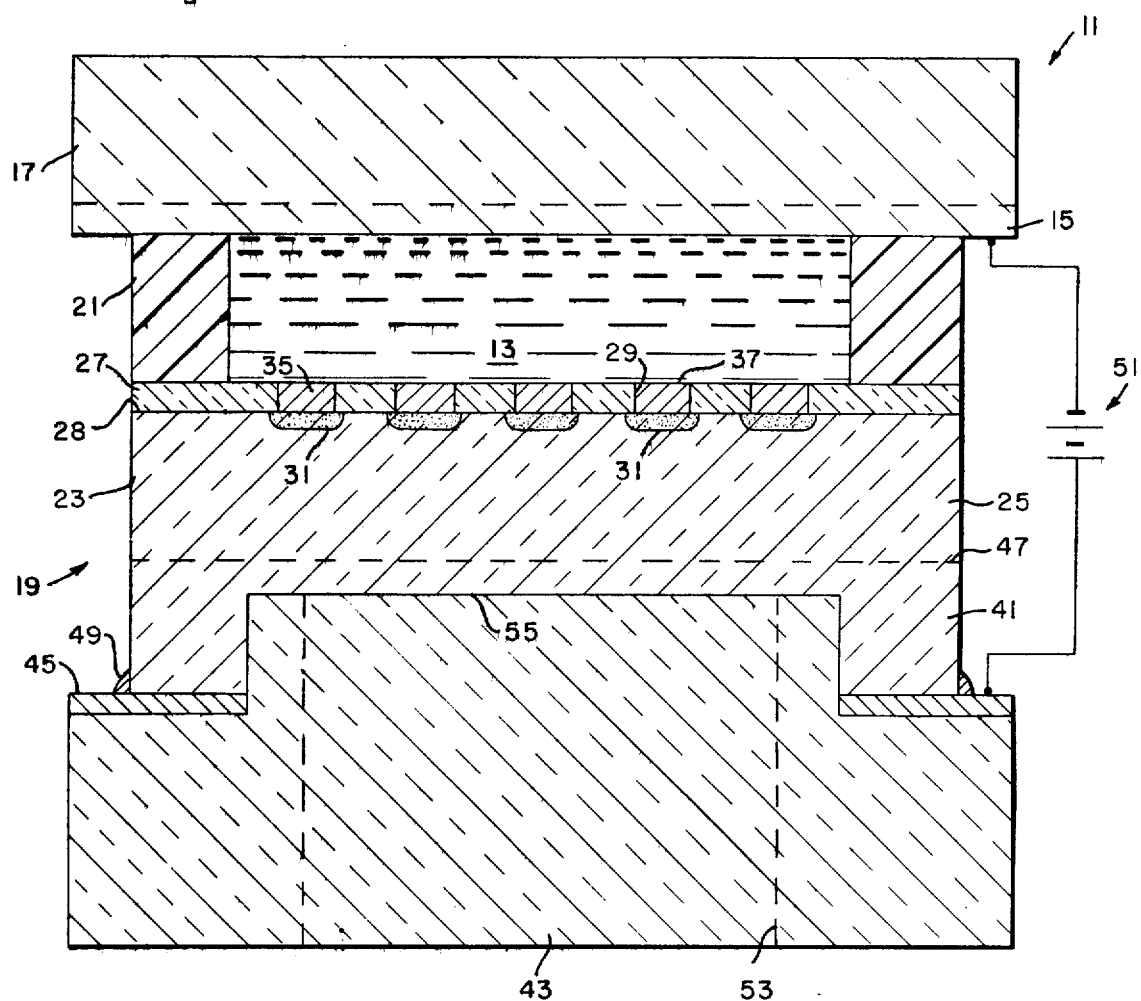
FIG. 1 is a sectional schematic illustration of a semiconductor diode array liquid crystal device in accordance with an embodiment of the present invention.

Referring now to the drawings and more particularly to FIG. 1, there is shown a semiconductor diode array liquid crystal device 11 in a storage mode or frame grabbing configuration. As can be seen, a storange-mode liquid crystal 13 such as a cholesteric-nematic mixture, is sandwiched between a transparent electrode 15 (such as an $InO_3/SnO$ electrode or part of a glass counter electrode 17) and a silicon diode array substrate 19, where the liquid crystal thickness is defined by an annular chemically inert material spacer 21, for example. In this embodiment, the substrate 19 consists of an N+ (phosphorus-doped) silicon wafer 23 onto which has been grown an epitaxial layer 25 of moderate doping (typically, $10\mu$ thickness and $10\Omega$-cm resistivity). An insulating film 27 (approximately $0.1\mu$) of $SiO_2$ is then grown on the epitaxial layer 25 along a planar surface 28 and an array of windows 29 (10μ dia. and 10μ spacing) is formed through the insulator 27 using standard photolithographic techniques.

In the areas defined by the oxide windows 29, a P-n or a Schottky barrier (minority carrier-collecting) junction 31 is formed on the epitaxial layer by means of a shallow boron diffusion or a metal deposition for example. Ohmic contacts 33 to the diffused P regions 31 can, for example, be formed by an Al evaporation (with subsequent alloying). The windows 29 in the oxide film 27 are then filled up to the outer surface 37 with electromechanically deposited Ag 39 which thereby provides electrical contact to the liquid crystal 13 and high optical reflectivity in both the visible and the infrared ranges.

The thickness of the active region 25 below the diode array may be reduced, as shown in this figure, to about 10 to 20μ by chemical etching, leaving an annular ring 41 at the parameter of the wafer 23 which can then be mounted onto a glass mesa structure 43, for example. An ohmic contact 45 to the N region is here formed at the n/N+ interface 47 which, because of its reduced thickness in the central region, provides a uniform transparent electrode to the epitaxial layer 25. Electrical contact to the N+ annular ring can be made with conventional solders 49.

In normal operation, a reverse bias is applied to each diode (minority carrier collecting junction) 31 through the liquid crystal 13 to the P regions and by the N+ transparent electrode 15 to the epitaxial n region 25 by a battery 51. Due to the presence of the oxide in areas between individual diodes 31, dc electric current can only pass through the volume of liquid crystal directly above each diode and for reverse biases sufficiently below breakdown, this current is limited to its saturation valve by thermal generation of mobile carriers at or near the metallurgical junction. For this condition, most of the applied dc bias ($V_R - I_S R_{LC}$) will be dropped across the depletion region of the diode thereby enhancing the electric field already present in the space region associated with the diffusion potential. By suitable choise of the liquid crystal and its conductivity dopant, the saturation current potential drop across the LC ($I_S R_{LC}$) can easily be kept below the threshold voltage for the particular type of optical activity under consideration (dynamic scattering, storage mode, field-induced birefringence).

In accordance with this embodiment, when light energy having a wavelength less than the fundamental absorption edge of Si ($\lambda_C \approx hc/E_g \approx 1.2\mu$) is incident on the substrate from the N+ side, it is absorbed in the thin n region, thereby creating one electron-hole pair per photon absorbed. The excess electrons created in this process will proceed to the depletion region of the nearest PN (or Schottky) junction by the combined action of an omnidirectional diffusion force, resulting from the local concentration gradient and a small drift field associated with the moderate resistivity of the n layer 25. The latter becomes increasingly more important for shorter wavelength photons which are mostly absorbed near the N+ substrate and could, by lateral diffusion, alone, reduce resolution.

The optically generated excess electrons which are transported to the nearest junction 31 are swept through the space charge region by the large electric field present there and then pass through the liquid crystal 13. By the ohmic character of the liquid crystal, this increased electrical current, resulting from the input photon flux, induces an additional potential drop across this layer only in the localized areas corresponding to the bright field of the input image. If the total local voltage should exceed the threshold value for the particular optical phenomenon under consideration, a replication of the input image will be induced in the liquid crystal 13 by means of either localized birefringence or scattering. The excess holes created by the optical absorption will be swept out of the n region 25 by the small electric field there and by excess carrier diffusion into the N+ region where they recombined immediately and hence do not contribute to the photoactivated electrical current passing through the liquid crystal.

When the device of FIG. 1 is to be used for the detection and display of x-rays or alpha particles, a modification of the glass substrate 43 shown by dashed lines 53 should be incorporated so that these energetic particles impinge on the silicon N+ surface 55 directly. For a sufficiently thick n region, the x-ray photons or aplha particles will be absorbed uniformly whereby electron-hole pairs are created via impact ionization. In this case, a trade-off must be made between sensitivity (which is proportional to thickness) and resolution, which goes as $(thickness)^{-1}$.

Figure 2:
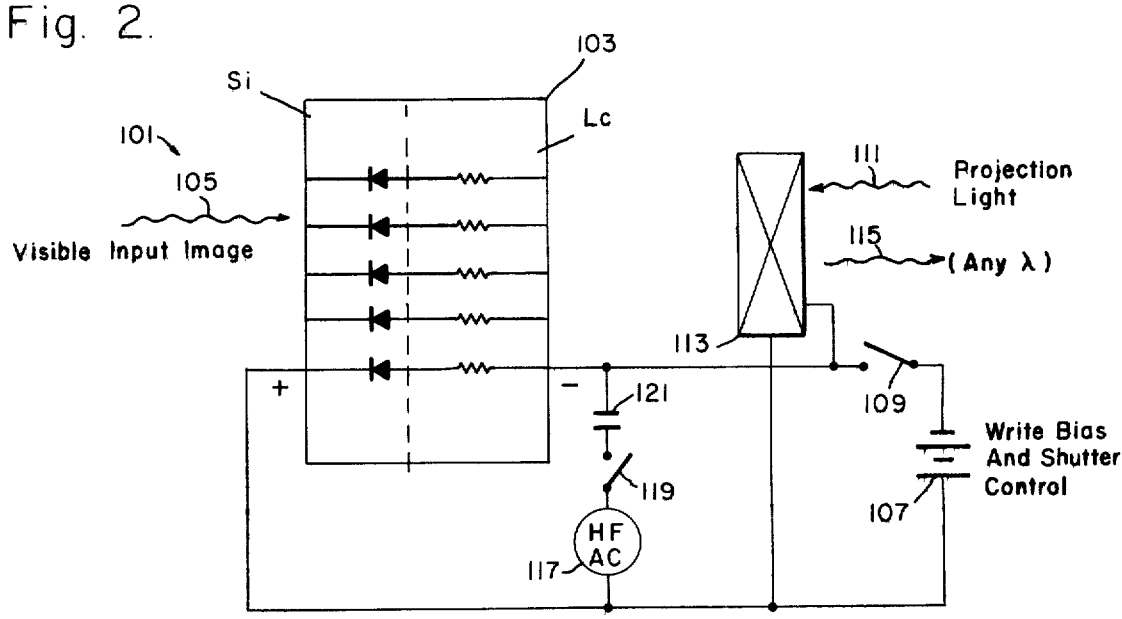
FIG. 2 is a schematic diagram of a frame storage mode embodiment of the present invention.

Referring now to the frame storage embodiment 101 illustrated in FIG. 2, the device includes a storage-mode liquid crystal 103 (such as MBBA+8% cholesteryl nonanote) to retain the input image 105 only when the dc bias from battery 107 is applied by closing switch 109 and the projection light 111 is shuttered off by a conventional electrically operated shutter 113. The output image 115 may then be projected onto a viewing screen (not shown) with visible light as long as the dc bias is first removed and the electrical circuit opened (by opening the switch 109) to prevent any dc current flow from the photovoltaic effects induced by the high intensity projection light 111. The projection light energy and, of course, the reflected light 115 may be of any desired wavelength.

The application of a high frequency ac voltage pulse (f=20 kH$_z$, 50 Vrms) from an ac signal generator 117, through an on-off switch 119 and a dc-isolating coupling capacitor 121 to the storage-mode liquid crystal 103 will erase the image, thereby allowing a sequence of frames to be stored and projected.

The feasability of this approach has been demonstrated using the frame storage cell of FIG. 1, where the storage liquid crystal was MBBA+8% cholesteryl nonanote. However, the substrate differed in two respects from that shown in FIG. 1. First, the 10-mil wafer was not thinned, thereby, insuring that the substrate would remain flat when sandwiched between the liquid crystal and the glass plates. This alternation required that the input image enter the active area of the substrate through the upper surface which is located about a micron above the junction plane. This in turn necessitates the use of a substrate without the reflective metal pads 39 shown in FIG. 1 and thus requires that the p+ silicon surface 37 function both as a mirror and as an electrical contact to the liquid crystal 13. Using this cell, it has been possible to store subsequently project a test pattern image of less than 20 μW/cm² intensity with a resolution which was limited by the storage liquid crystal and not by the diode array. With an applied reverse bias of 15 volts, dc current switching ratios ($R = I_{on}/I_{dark}$) of 14/1 and 6/1 using incident green light ($\lambda \sim 520$ nm) of 6 $\mu$W/cm$^2$ and 0.6 $\mu$W/cm$^2$, where respectively obtained.

Figure 3:
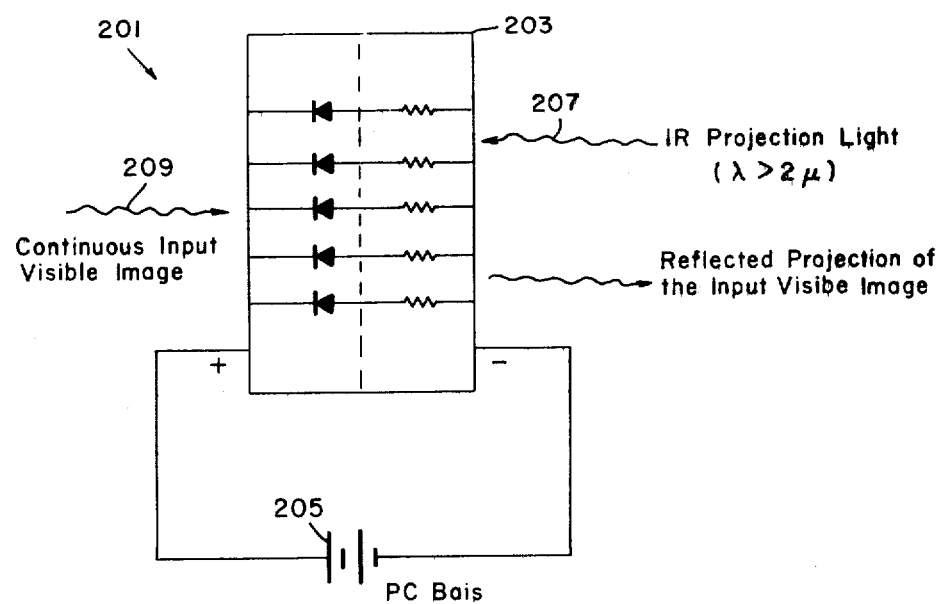
FIG. 3 is a schematic diagram of a visible-to-infrared converter embodiment of the present invention.

The device 201 shown in FIG. 3 employs a dynamic scattering mode or a field-effect liquid crystal 203 for real-time visible-to-infrared (IR) image conversion and projection. In this application, the dc field, through the use of battery 205, is continuously applied. As long as only the infrared projection light 207 ($\lambda \geq 2\lambda_c$) is incident on the silicon substrate through the liquid crystal 203, a faithful duplication of a continuous input visible image 209 will be provided in the form of a reflected projection 211, without any optical degredation due to projection light contamination.

With a dynamic scattering ester liquid crystal and including a thinned SDA substrate and without metal reflective pads 39, the spectral and intensity dependence of the dc current switching ratio R has been measured. Ratios of greater than 350/1 for incident intensities of 46 $\mu$W/cm$^2$ and $\lambda = 706$ nm and 168/1 with 3 $\mu$W/cm$^2$ at 520 nm have been obtained. Under the latter set conditions, the photo-activated transient response of R has been observed to be less than 3 msec for both the rise and the decay modes.

From the foregoing it should be evident that there has been described a new and unobvious semiconductor diode array liquid crystal device wherein transient characteristics are limited only by the particular storage liquid crystal chosen for the device, and which is sensitive over a wide spectral range (0.4$\lambda$ to 1.2$\lambda$) and even responsive to both x-rays and alpha particles. The very high sensitivity can be at least partically attributed to the fact that the device operates with dc, and the reverse bias leakage currents that ultimately limit sensitivity can be minimized by careful diode design and wafer processing procedures. It should also be noted that the devices according to the invention are chemically inert since the interface between the liquid crystal and the substrate is protected by a SiO$_2$ barrier, for example, in the inactive areas between individual diodes and by a suitable chosen metal on each diode.

It should further be understood, that materials exhibiting similar desired characteristics to those herein described may be utilized, and that various changes and modifications obvious to persons skilled in the art to which the invention pertains are deemed to lie within the spirit, scope and contemplation of the invention.

What is claimed is:

1. A semiconductor diode array liquid crystal device for storage mode and infrared applications, comprising:
    a liquid crystal structure having an inner surface;
    a semiconductor substrate having an inner surface;
    an insulating film disposed between and separating said inner surfaces and including an array of windows that are both reflective of incident light energy thereon and conductive of electric current, said semiconductor substrate including an active region therein along said inner surface of said semiconductor substrate, a separate minority carrier collecting junction being disposed in said active region adjacent each of said windows, said active region being now wider than the diffusion length of the minority carriers in the material of said active region; and
    bias means associated with said liquid crystal structure and said semiconductor substrate for producing an electric field within said liquid crystal substrate and for back biasing said minority carrier collection junction.

2. The semiconductor diode array liquid crystal device of claim 1, wherein said liquid crystal structure is a storage mode liquid crystal device.

3. The semiconductor diode array liquid crystal device of claim 1, wherein said liquid crystal structure is a dynamic scattering liquid crystal device.

4. The semiconductor diode array liquid crystal device of claim 1, wherein said liquid crystal structure is a field-effect liquid crystal device.

5. The semiconductor diode array liquid crystal device of claim 1, wherein said semiconductor substrate is a P-N structure.

6. The semiconductor diode array liquid crystal device of claim 1, wherein said semiconductor substrate is a N-P structure.

7. The semiconductor diode array liquid crystal device of claim 2, wherein said liquid crystal device is a cholesteric-nematic mixture.

8. The semiconductor diode array liquid crystal device of claim 1, wherein said minority carrier collecting junctions are P-N junctions.

9. The semiconductor diode array liquid crystal device of claim 1, wherein said minority carrier collecting junctions are Shottky barrier junctions.

10. The semiconductor diode array liquid crystal device of claim 1, wherein said active region is an epitaxial layer of the order of 10$\mu$ thick and 10$\Omega$-cm resistivity.

11. The semiconductor diode array liquid crystal device of claim 1, wherein said windows are wells in said insulating film and filled with optically reflective and electrically conductive material.

* * * * *